United States Patent [19]
Bice et al.

[11] Patent Number: 4,924,401
[45] Date of Patent: May 8, 1990

[54] AIRCRAFT GROUND COLLISION AVOIDANCE AND AUTORECOVERY SYSTEMS DEVICE

[75] Inventors: Gregory W. Bice; Mark A. Skoog, both of Lancaster, Calif.; John D. Howard, Ft. Lauderdale, Fla.

[73] Assignee: The United States of America as represented by the Secretary of the Air Force, Washington, D.C.

[21] Appl. No.: 120,567

[22] Filed: Oct. 30, 1987

[51] Int. Cl.$^5$ .............................................. G05D 1/10
[52] U.S. Cl. .................................... 364/433; 364/460; 244/181; 342/29; 342/65
[58] Field of Search ............... 364/428, 433, 434, 460, 364/461; 342/29, 65; 318/584; 340/970; 73/178 T; 244/76 R, 180, 181

[56] References Cited

U.S. PATENT DOCUMENTS

| | | | |
|---|---|---|---|
| 2,630,283 | 3/1953 | Hanson | 318/584 X |
| 2,736,878 | 2/1956 | Boyle, Jr. | 364/433 X |
| 3,011,738 | 12/1961 | Skramstad et al. | 364/434 X |
| 3,245,076 | 4/1966 | Le Tilly et al. | 342/65 |
| 3,396,391 | 8/1968 | Anderson et al. | 342/65 |
| 3,530,465 | 9/1970 | Treffeisen et al. | 342/65 |
| 3,553,689 | 1/1971 | Bechtel | 342/65 |
| 3,706,988 | 12/1972 | Bayle et al. | 342/65 X |
| 4,058,710 | 11/1977 | Altmann | 342/65 X |
| 4,224,669 | 9/1980 | Brame | 340/970 X |
| 4,467,429 | 8/1984 | Kendig | 364/433 |
| 4,617,633 | 10/1986 | McAllister | 318/584 X |

*Primary Examiner*—Eugene R. LaRoche
*Assistant Examiner*—Benny T. Lee
*Attorney, Agent, or Firm*—Jacob N. Erlich; Donald J. Singer

[57] ABSTRACT

The invention comprises an aircraft ground collision avoidance system which utilizes a flight control computer for monitoring aircraft flight states and calculating preferred aircraft flyup altitudes at which automatic aircraft flyups should be initiated. The flyup altitude is determined by calculating aircraft altitude to be lost during a recovery maneuver from a current aircraft flight state. The invention also comprises an aircraft autopilot for monitoring aircraft flight states and initiating an automatic aircraft flyup when so directed by the flight control computer. The monitored aircraft states include aircraft airspeed, angle of attack, bank angle and velocity. Sensor lag, aircraft load factor and engine throttle position are also considered in determining when to conduct an automatic aircraft flyup.

26 Claims, 13 Drawing Sheets

AIRCRAFT GROUND COLLISION AVOIDANCE AND AUTORECOVERY SYSTEMS DEVICE

STATEMENT OF GOVERNMENT INTEREST

The invention described herein may be manufactured and used by or for the Government for governmental purposes without the payment of any royalty thereon.

TECHNICAL FIELD

This invention relates to a method and apparatus for preventing inadvertent aircraft ground collisions and is particularly related to providing a computer operated auto recovery that is initiated semi-independently of pilot control.

BACKGROUND OF THE INVENTION

An obvious intent of any automatic recovery system for almost any aircraft is to prevent ground impact during controlled flight of the aircraft. Many aircraft have standard proximity alarms for alerting pilots to the nearness of ground or water impact surfaces. These alarms can be based on inadmissible rates of descent of the aircraft or nearness of the ground. While proximity alarms are an improvement over prior instruments they are not a solution to many of problems that have been shown to cause aircraft ground impacts.

The need for ground collision avoidance extends to a wide variety of aircraft and scenarios ranging from terminal area navigation for commercial airliners to low level navigation, pilot spatial disorientation and g-induced loss of consciousness (GLOC) for high performance aircraft. While some aircraft have been equipped with ground proximity warning systems, these systems tend to be as much of a nuisance as an aid during flight. Most of the existing ground proximity warning systems contain no provisions for variations in aerodynamics, relying on the pilot to compensate for these variations by giving him a finite amount of time to recover level flight. At the same time these systems are passive, relying on pilot awareness and competence to recover from the situation.

Thus two essential problems remain with proximity warning systems. Firstly, if the pilot or crew is incapacitated, as might occur due to loss of cabin pressure after a bird strike through the cockpit windshield, for example, pilot awareness or ability may not be up to the task of controlling the aircraft and recovering level flight. Further, such conventional ground proximity warning systems contain insufficient provisions to account for variations in aircraft aerodynamics and flight state and reliably predict when aircraft flyups are required without setting off numerous nuisance alarms. Numerous nuisance alarms will often result in crews disabling such safety systems.

An innovative approach to this problem which appears to be a forward step in the art of aircraft auto recovery is disclosed in U.S. Pat. No. 4,058,710 to Altman. The Altman patent discloses a process for preventing unwanted contact by an aircraft with land or water. When applied over land the process assumes flat terrain or low hills. Altman's process utilizes the aircraft's rate of descent and altitude to compute a limiting altitude which is further modified by the aircraft's ability for transverse acceleration. This limiting altitude is used to determine when to activate an automatic feedback controller which provides the aircraft with the maximum feasible transverse acceleration. Thus the Altman device attempts to continuously calculate a limiting altitude for the aircraft below which automatic controls will be applied for aircraft recovery. Various theoretical schemes are proposed by Altman in this patent for determining this limiting altitude. All of these schemes however, appear to be either difficult to incorporate into an aircraft control design or simplified in a manner that will cause spurious effects including nuisance flyups during controlled flight.

A need therefore exists for a ground collision avoidance system capable of calculating a decision height at which a recovery maneuver must be initiated in order to prevent aircraft penetration of a preset floor or ground impact.

A further need exists for a ground collision auto recovery system that is sufficiently sophisticated to initiate a recovery maneuver when required while avoiding a multitude of nuisance flyups that interfere with controlled flight.

Yet another need exists for a ground collision avoidance system which can be made at minimum cost and which can be developed for a multitude of aircraft.

SUMMARY OF THE INVENTION

The invention comprises an aircraft ground collision avoidance system which utilizes a flight control computer for monitoring aircraft flight states and calculating preferred aircraft flyup altitudes at which automatic aircraft flyups should be initiated. The flyup altitude is determined by calculating the aircraft altitude to be lost during a recovery maneuver from a current aircraft flight state. An aircraft autopilot is provided for monitoring aircraft flight states and implementing an automatic aircraft flyup when so directed by the flight control computer. The monitored aircraft states include aircraft angle of attack, bank angle and velocity.

In the preferred embodiment of the invention the aircraft altitude calculated to be lost ($\Delta Z$) comprises $\Delta z_1 + \Delta z_2 + \Delta z_3$ wherein $\Delta z_1$ accounts for altitude lost during a wings level dive to level flight while the aircraft is maintaining a constant load factor, $\Delta z_2$ accounts for the time required for an aircraft to attain a desired pull up load factor and $\Delta z_3$ accounts for correction of initial aircraft bank angle during a flyup recovery.

In a further preferred embodiment of the invention $\Delta Z$ also comprises $\Delta z_4$ which accounts for correction of aircraft roll rate at flyup initiation. In yet a further preferred embodiment of the invention, $\Delta Z$ comprises $\Delta z_5$ which accounts for sensor lags in providing the flight computer with flight state information.

In one preferred embodiment, $\Delta Z$ is also comprised of $\Delta z_6$ which adjusts for aircraft non-idle power settings. In an alternate embodiment of the invention an auto throttle is utilized for adjusting air speed to provide a minimum turn radius aircraft flyup. In this alternate embodiment $\Delta z_6$ is not required.

Another aspect of the invention is the method of automatically avoiding aircraft ground collisions. The method comprises the steps of: entering a preselected aircraft floor altitude into an aircraft flight control computer; monitoring aircraft flight states with said computer; calculating the amount of altitude to be lost during a recovery maneuver; adding the amount of altitude to be lost during the recovery maneuver to the preselected floor altitude to determine an aircraft flyup altitude; comparing the flyup altitude to current aircraft altitude; and initiating an automatic aircraft flyup if aircraft altitude is less than or equal to the flyup altitude. In this preferred embodiment of the invention aircraft bank angle is monitored in order to control aircraft aileron deflection during the automatic aircraft flyup and pitch attitude is monitored in order to control aircraft elevator deflection during the automatic flyup.

In a further aspect of this preferred embodiment of the invention, the method of automatically avoiding aircraft ground collisions can comprise the step of selectively blending pilot flight commands with the automatic fly up controls.

It is therefore an object of the invention to provide a system for determining and controlling automatic aircraft fly ups to avoid ground collisions.

It is a further object to provide an efficient means for determining when to initiate an aircraft fly up.

Yet another object of the invention is to provide a method of automatically avoiding aircraft ground collision.

An advantage of the invention is the ability of the auto recovery system to reliably prevent ground collisions without producing numerous nuisance fly ups.

BRIEF DESCRIPTION OF THE DRAWINGS

The foregoing and other objects and advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE INVENTION

The intent of this invention is to establish an automatic recovery system to prevent ground impact during controlled flight of any aircraft. The basic concept of the invention is to calculate a decision height at which a recovery maneuver must be initiated in order to prevent the penetration of a preset floor, or preselected minimum altitude. Autorecovery is defined as an automatic flyup in which a recovery maneuver is initiated in order to prevent penetration of a preset floor, or preselected minimum altitude. Autorecovery is defined as an automatic flyup in which a recovery maneuver is initiated in order to prevent penetration of a preset floor, or preselected minimum altitude. The recovery maneuver is automatically initiated once this decision height is reached and the maneuver is terminated when the aircraft recovery is complete or the pilot overrides recovery commands to control the aircraft.

This automatic recovery system applies aircraft unique dynamics and sensors to flight mechanics equations in defining its initial configuration. Development is then completed using numerical methods that refine the configuration based on simulation and validated by flight test data. The basic embodiment is applicable to a wide variety of aircraft and it is thought that for each aircraft the time and cost of refining the configuration and conducting the flight tests can be minimized while the accuracy, safety and utility of the system can be increased.

The invention can be divided into three main areas. The input sensors, the recovery initiation determination and the recovery maneuver. Each of these aspects of the invention will be addressed below. Primary emphasis is placed an accurate recovery initiation methods and a mechanism to safely provide for aircraft recovery.

The hardware requirements fall into the same three general categories as the invention as a whole. They are: sensors to determine aircraft state; a computer processor (flight computer) for calculating the recovery initiation decision height; and an autopilot capable of commanding the aircraft through a satisfactory recovery maneuver. It is preferred, but not required, that the computer processor and autopilot consist of digital electronic components.

RECOVERY MANEUVER

Figure 1:
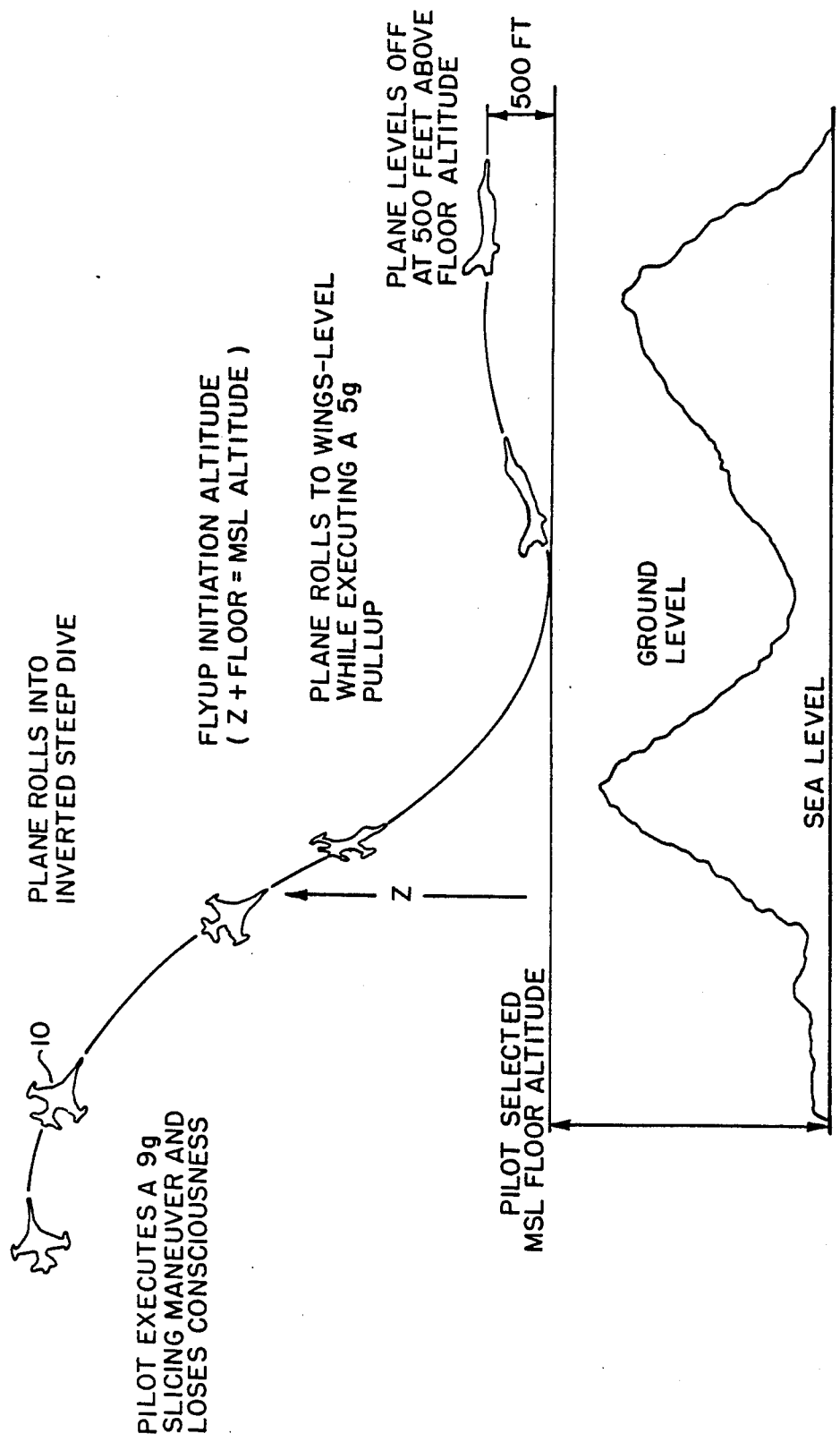
FIG. 1 is a schematic representation of an aircraft recovery maneuver using the auto recovery system of this invention.

A crucial step in any autorecovery system is the establishment of a recovery maneuver which can be executed by an autopilot. The recovery maneuver discussed below is applicable to most aircraft. The basic principle of the maneuver is to first roll the aircraft to a wings level, upright attitude and then pull the aircraft nose above the horizon. FIG. 1 shows a typical preferred recovery maneuver.

In the view of FIG. 1, an aircraft 10 is schematically shown executing a high g maneuver which results in pilot g induced loss of consciousness (GLOC). As a result of the pilot's loss of consciousness the plane rolls into a steep, inverted dive. This aircraft attitude is sensed by the flight computer and results in a flyup initiation. The plane then preferably rolls to a wings level position while executing a recovery pull up until the plane levels off at or above the floor altitude. In the example of FIG. 1 a military fighter aircraft is presupposed executing a 9 g slicing maneuver and a 5 g pull up. The invention, however, should not be limited to fighter type aircraft.

Figure 2:
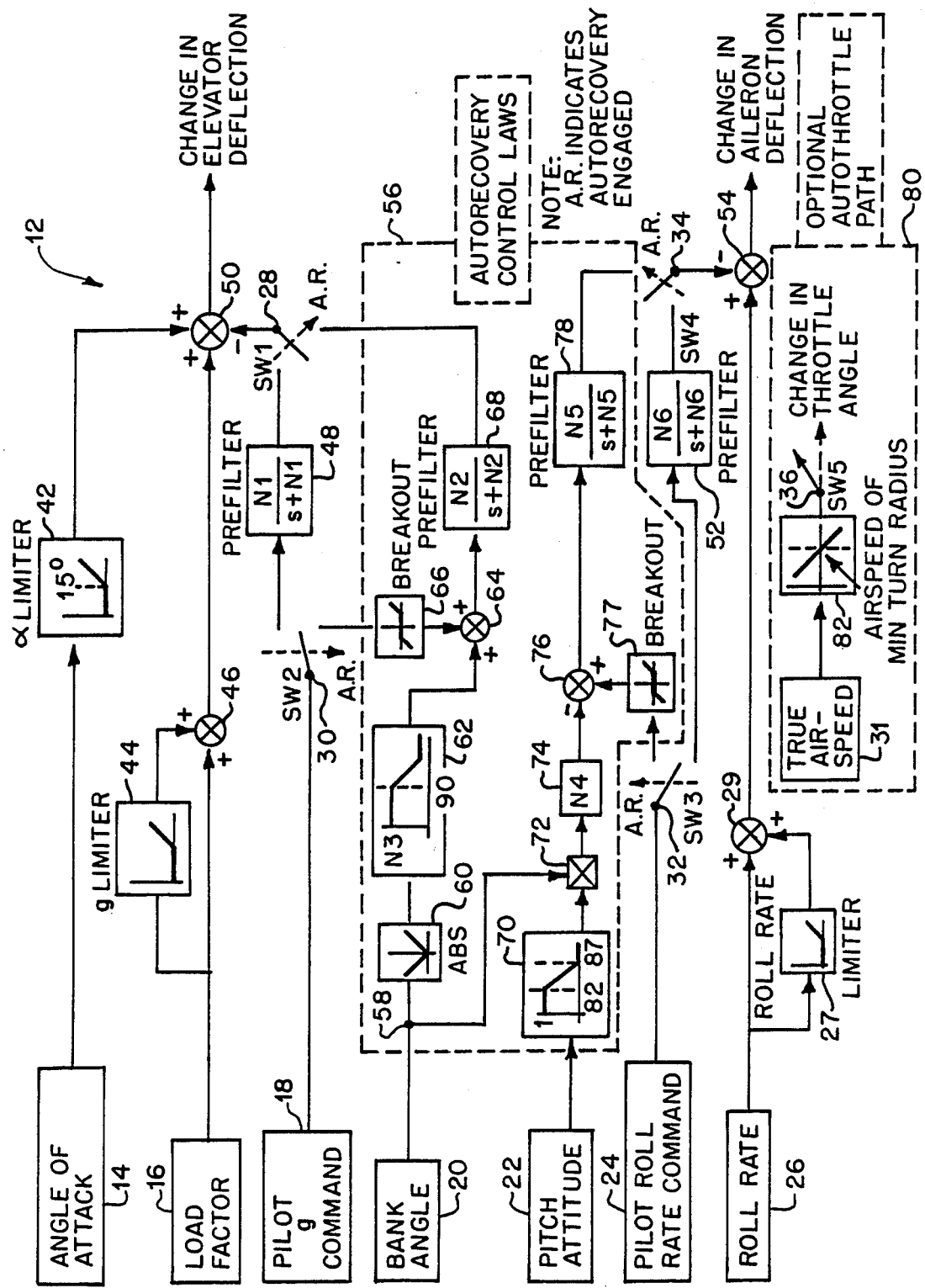
FIG. 2 is a schematic representation of an autopilot for performing an auto recovery which embodies principles of this invention.

A simplified schematic of an autopilot for performing the recovery manuever is shown in FIG. 2. Various sensors are used by both the autopilot and the flight computer to determine when to initiate and how to control the auto recovery. FIG. 2 shows the inputs that affect the autopilot 12, they include: an angle of attack sensor 14, an aircraft load factor sensor 16, the pilot g command 18, an aircraft bank angle sensor 20, an aircraft pitch attitude sensor 22, the pilot roll rate command 24 and an aircraft roll rate sensor 26. Aircraft true air speed 31 is also utilized in an optional embodiment for setting an autothrottle.

The autopilot comprises two main control groupings. One control grouping effects changes in aircraft elevator deflection while the other grouping effects charges in aileron deflection. Note that FIG. 2 applies reverse convention summing in controlling the elevator and aileron.

The autopilot can be engaged or partially disengaged from pilot commands through the use of five switches 28, 30, 32, 34 and optional switch 36. All five switches work in unison and are controlled by the flight computer 40 (FIG. 3) when an auto recovery is initiated.

The inputs that affect elevator deflection are the aircraft angle of attack sensor 14, the load factor sensor 16, the pilot g command 18 and the aircraft bank angle sensor 20.

Aircraft angle of attack 14 is sensed from pressure ports on the aircraft nose and converted to an electronic signal which is fed to the angle of attack limiter 4. The angle of attack limiter produces a signal that limits aircraft angle of attack (by changing elevator deflection) when the angle of attack is greater than 15 degrees. Aircraft angle of attack is limited to insure aircraft control and prevent stall during the recovery maneuver. It is not feasible, particularly at slow air speeds, to fully attain the target load factor due to aircraft stall characteristics. For aircraft that have varying angle of attack limits due to differing store or fuel loadings the most restrictive value of angle of attack that prevents aircraft stall should be used regardless of loading. The values used for the angle of attack limiter during the recovery need not differ from those used during manual flight.

The aircraft load factor 16, which measures the normal acceleration load on the aircraft and is calculated from accelerometer means, is fed through a g (load) limiter 44 and a summing junction 46. The load limiter produces a signal when the aircraft load factor is above a certain preselected g force. The signal from the load limiter is summed (46) with the signal from the load factor sensor to produce a signal that changes elevator deflection to reduce the g force load on the aircraft when it is above the preselected limit.

During normal flight the pilot g signal command 18 is sent through a prefilter 48 and into an elevator summing junction 50. The prefilter removes electronic noise and momentary inadvertent commands but otherwise directly transmits the pilot's commands to the elevator summing junction 50.

The prefilter is a dynamic element that keeps high frequency commands from passing through the system. It decreases the magnitude of the aircraft response above certain corner frequencies so that inadvertent commands will have no effect. Steady state input commands actively pursued by the pilot will, however, pass through the filter. This is particularly important in modern fly-by-wire aircraft where control surfaces can respond very quickly to inadvertent inputs.

The elevator summing junction 50 serves to transmit the pilot's g command to the elevators without allowing the aircraft to exceed its safe g force limit. For example, assume the pilot requests a g force increase of 7 g's and the aircraft g force limit is 7 g's Assuming that the aircraft is already experiencing 2 g's, pilot commands will result in an elevator deflection change of no more than that which would produce an additional 5 g's since the signals generated by the g limiter 44 and the angle of attack limiter 42 counteract the pilot's command. Thus the total g force on the aircraft is limited to the 7 g's of the safety limit.

Returning again to the autopilot grouping that controls elevator deflection, we will now explore operation of this portion of the autopilot during a recovery maneuver when switches 28 and 30 are moved to the auto recovery (A.R.) position. Bank angle is sensed by a bank angle sensor 20 and transmitted into the auto recovery portion 56 of the autopilot 12. The bank angle signal is converted into load factor and roll rate commands at a divider 58. The load factor branch is given an absolute mathematical value (i.e., positive) by converter 60 and then transmitted to a gain function operator 62.

The value of the gain function (N3) depends on the load factor capability of the aircraft. A reasonable value for N3 is between 50 and 75 percent of the maximum load factor capability of the aircraft, (i.e., a 9 g aircraft would have between a 5 g and 7 g recovery load factor). The actual value chosen will be a tradeoff on the part of the aircraft operator and may depend on aircraft mission. A 50 percent value for N3 will allow the pilot more capability to override the recovery maneuver while a 75 percent value for N3 lowers the auto recovery initiation altitude and helps avoid nuisance commands for recoveries and thus makes the auto recovery system more transparent to the pilot while maneuvering close to a floor altitude. For a commercial aircraft, therefore, a lower value may be desired since nuisance recoveries are less likely in normal commercial aircraft maneuvers than in military aircraft maneuvers. A higher value might therefore be desired for military aircraft whose complex maneuvers might inadvertently engage the auto recovery system more often.

When bank angles are greater than 90 degrees the load factor command should be reduced to one or less in order to allow the aircraft to rotate to wings level for an optimum fly up. The slope of the transition from the small command to the full N3 value is dependent on the roll rate that the auto recovery system generates for the particular aircraft.

The adjusted bank angle command is summed at summing junction 64 with pilot commands. A stick-force breakout limiter 66 is provided to eliminate weak, inadvertent or uncontrolled pilot stick-force commands which might degrade the recovery maneuver if blended with the auto recovery commands. The size of the stick-force breakout limit depends on the amount of loading desired for blending. The stick-force breakout limit should never be less than a 10 pound input, as this size of stick force input can easily be achieved inadvertently by the pilot. The pilot must intentionally manipulate the controls in order to overcome the nulling effect of the stick-force breakout limiter 66 and affect the automatic flyup maneuver.

The signal from summing junction 64 passes through prefilter 68 which eliminates inadvertent and transient signals. This signal is then routed to elevator summing junction 50 where elevator movement is limited to the aircraft load limits as the elevator is operated to provide a controlled fly up.

Note that the pilot must be allowed to override the recovery maneuver if needed. The autopilot is set for automatic disengagement if the pilot's command force exceeds some preset value. This disengagement criteria need only be in the nose up pitch axis that would induce flight recovery. Once the disengagement preset is exceeded the auto recovery is temporarily disengaged, giving the pilot sole command of the aircraft. This pilot disengagement preset value can be fed into the flight computer 40 to produce the automatic disengagement. If no blending of pilot commands with the auto recovery is desired, the breakout 66 should be set equal to the disengagement preset value.

The other control grouping of the autopilot changes aileron deflection. This grouping receives inputs from the bank angle sensor, the pitch attitude sensor, the roll rate sensor, and from pilot roll rate commands.

During normal autopilot operation, the pilot roll rate command 24, the roll rate signal 26 and the roll rate limiter 27 operate in much the same manner as the load load factor sensor 16 and the load limiter 44. The roll rate is sensed by the roll rate sensor 26 and fed through a roll rate limiter 27. The roll rate limiter produces a signal when the aircraft roll rate exceeds a preselected value, this signal is added to that of the sensor at a summing junction 29. The summing junction 29 produces a signal that is combined with pilot roll rate command 24 at summing junction 54. The prefilter 52 eliminates any inadvertent transitory pulses signal in the pilot roll rate command signal. The aileron summing junction 54 combines these two signals in a manner that limits changes in aileron deflection so that aircraft roll rate will not exceed a preselected limit. Only the roll rate sensor and limiter and the pilot roll rate command are used to operate the aileron during normal flight.

When an auto recovery is initiated by the flight computer switches 32 and 34 operate to send pilot commands through a breakout and to include the bank angle and pitch attitude sensors in operation of the aileron. The bank angle signal is utilized to make sure that the aircraft is brought to wings level during auto recovery. Pitch attitude is considered in case the aircraft approaches a 90 degree dive prior to auto recovery. While near a 90 degree dive it is not necessary to roll the wings level prior to commanding the N3 value of load factor (load factor command 62) in order to bring the aircraft nose up quickly. In this case, when dive angle is very steep, a zero value for bank angle should be passed into the aileron deflection grouping. Pitch angle 22 is therefore fed to a signal limiter 70 and joined with the signal for bank angle at multiplier junction 72. For dive angles greater than 87 degrees, zero is multiplied by the bank angle giving a null signal. For a small 5 degree shift between 82 degrees and 87 degrees a reduced bank angle signal will be transferred through the multiplying junction 72. If the pitch angle of the aircraft is less than 82 degrees the full bank angle will be transmitted to the N4 gain module 74 so that the aircraft can be brought to wings level.

The N4 gain module 74 converts the bank angle signal into a roll rate command for rolling the aircraft to a wings level altitude. The gain is proportioned so that at 90 degrees of bank, 50-75 percent of the aircraft maximum roll rate will be commanded. The roll rate command from the N4 module is also limited while above 90 degrees of bank so as not to exceed the 50 to 75 percent value. In this manner the roll rate commanded will be constant between 180 and 90 degrees of bank angle. Below 90 degrees of bank angle the roll rate command is on a declining schedule so that the aircraft will not overshoot wings level.

The N4 gain module 74 can preferably be equal to about 2 in order to multiply the degrees of roll by two and command a roll rate that quickly produces level flight. For example a bank of 15 degrees would produce a roll rate of 30 degrees per second which would result in level flight in substantially less than one second.

The roll rate command from the N4 gain module 74 is directed to summing junction 76 which is used to blend in pilot roll rate commands. Switch 32 is aligned with breakout 77 to feed the pilot roll rate command signal into the summing junction 76 during the auto recovery. The breakout 77 is similar to breakout 66, and is never set less than the equivalent of a ten pound input since smaller inputs can easily occur by accident. The summed signal then passes through prefilter 78 that filters out any remaining transient signals. The signal is then fed through switch 34 into aileron deflection summing junction 54 where it is combined with the signal from the roll rate limiter in order to control the aileron during auto recovery while preventing the aircraft roll rate from exceeding aircraft structural limitations.

Another aspect of the autopilot configuration is the use of an optional autothrottle 80. If the aircraft is equipped with such an autothrottle, the control logic at control block 82 can be used to adjust airspeed to attempt to achieve a minimum turn radius and therefore the quickest recovery. The autothrottle therefore increases engine power when the aircraft is angle of attack limited (approaching stall) and decreases power when the aircraft is load factor limited. This will minimize the altitude loss during the autorecovery maneuver.

Filtering or sumping of flight control system commands should be avoided when engaging the autorecovery system. The filtering or sumping of control systems commands is common when the switching of command paths is required. This filtering is used to avoid transient inputs and abrupt aircraft motions that occur when command paths are switched. During an autorecovery, however, the smallest delays in commands can mean the loss of hundreds of feet of altitude. As a result an abrupt, response is precisely what is required.

Figure 3:
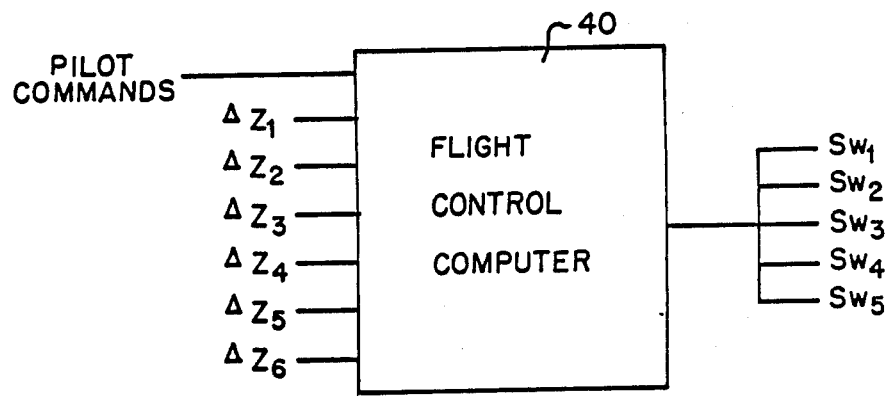
FIG. 3 is a schematic representation of a flight computer for determining a fly up altitude according to the principles of this invention.

The most critical part of the autorecovery system is the calculation of when to initiate the recovery maneuver. A predictive algorithm has therefore been established for use in the flight computer 40 which is shown in FIG. 3. The flyup initiation altitude is calculated from two parameters: floor altitude and $\Delta Z$, which are shown graphically in FIG. 4.

Figure 4:
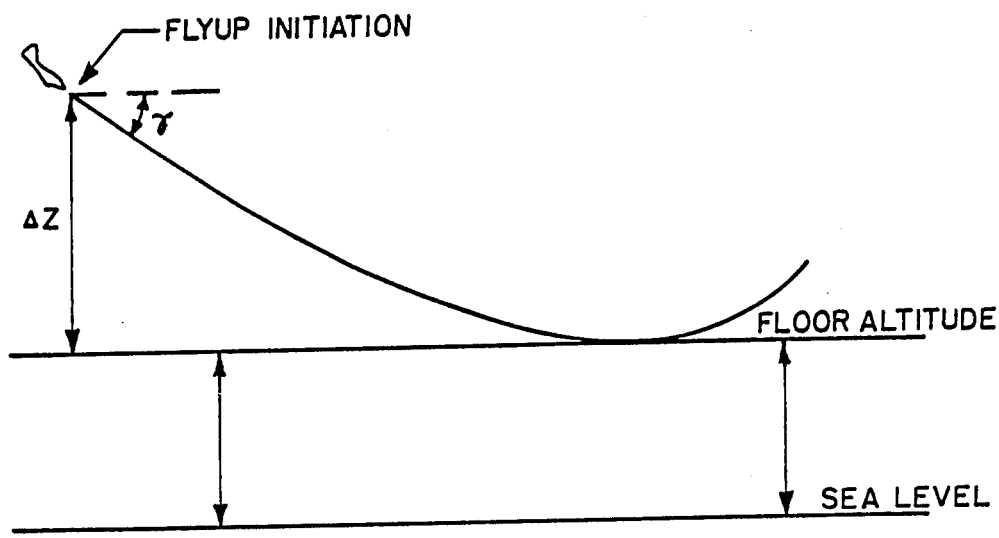
FIG. 4 is a schematic representation of an auto recovery profile as dictated by this invention.

Floor altitude is selected by the pilot and entered prior to, or during, the flight. This floor altitude is constant, representing the lowest point of the recovery. FIG. 4 shows floor altitude for a mean sea level recovery. The $\Delta Z$ parameter is the other component of the equation and represents the predicted amount of tapeline altitude that will be lost during the recovery. When actual altitude minus $\Delta Z$ is equal to or less than the floor altitude, an autorecovery is initiated.

The $\Delta Z$ parameter is based on a series of up to six equations ($\Delta_1 z, \Delta z_2, \ldots \Delta z_6$), each of these six equations accounting for a separate independent segment of the recovery maneuver some of which may not be required for all aircraft. The $\Delta z_1$ equation accounts for the altitude lost during a wings level pullup; $\Delta z_2$ accounts for the altitude lost during the g-force onset of the wings level pullup; $\Delta z_3$ accounts for the altitude lost while rolling to wings level, $\Delta z_4$ accounts for high roll rate effects; $\Delta z_5$ accounts for sensor lags in the data input to the flight computer and $\Delta z_6$ accounts for the extra altitude lost during accelerating dives (not required if the aircraft is equipped with an autothrottle). The fact that these equations are independent of one another greatly simplifies development and testing of the system with a variety of aircraft.

$$\Delta Z = \Delta z_1 + \Delta z_2 + \Delta z_3 + \Delta z_4 + \Delta z_5 + \Delta z_6 \quad (1)$$

where: $Z = f(\gamma, V, M, p, \phi, \text{g-onset}, h, \text{sensor lag})$ and where
  $\gamma$ = aircraft flightpath angle
  V = true airspeed
  M = Mach number
  P = aircraft roll rate
  $\phi$ = aircraft bank angle
  g-onset = load factor onset rate
  h = altitude
  sensor lag = lag response time of onboard sensors

Wings Level Dive Compensation

The $\Delta z_1$ term accounts for the altitude lost from a wings level dive to level flight while maintaining a constant load factor. The equation for $\Delta z_1$ is derived from the general set of equations of motion for a vertical loop. For our purposes, it is sufficient to simplify the equation by ignoring the dynamic change in turn radius as the normal load factor vector aligns with the gravitational vector during the pullout. In its final form, the equation for calculating the radius of curvature of the turn is:

$$R = V^2/[g(n - \cos \gamma)] \quad (2)$$

where:
  V = True airspeed in ft/sec
  g = acceleration due to gravity
  n = load factor
  $\gamma$ = flightpath angle At the bottom of the loop, $\gamma = 0$ degrees, therefore, $\cos \gamma = 1$ which is what will be used to simplify the equation.

Figure 5:
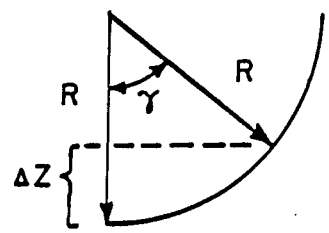
FIG. 5 is an illustration showing the definition of the variable $\Delta z_1$ for an arbitrary dive angle.

To define $\Delta z_1$, the aircraft dive angle must be known. The illustration of FIG. 5 shows how $\Delta z_1$ is defined for an arbitrary dive angle.

Using trigonometry, the value for $\Delta z_1$ can be calculated, its most general form being:

$$\Delta z_1 = R - R(\cos(-\gamma)) \quad (3)$$

Assuming the dive angle does not exceed 90 degrees, equation (3) can be rewritten as:

$$\Delta z_1 = R(1 - \cos\gamma) \quad (4)$$

Substituting equation (2) into (4) results in:

$$\Delta z_1 = \frac{V^2}{(n-1)g}(1 - \cos\gamma) \quad (5)$$

However, airspeed and aerodynamic factors prevent the assumption that $(n-1)$ will always be applicable. Therefore, we substitute $K_1$ for $(n-1)$ and model it as a gain function representing g-capability as a function of flight condition. In its final form, $\Delta z_1$ appears as:

$$\Delta Z_1 = \frac{V^2}{K_1 g}(1 - \cos\gamma) \quad (6)$$

Figure 6:
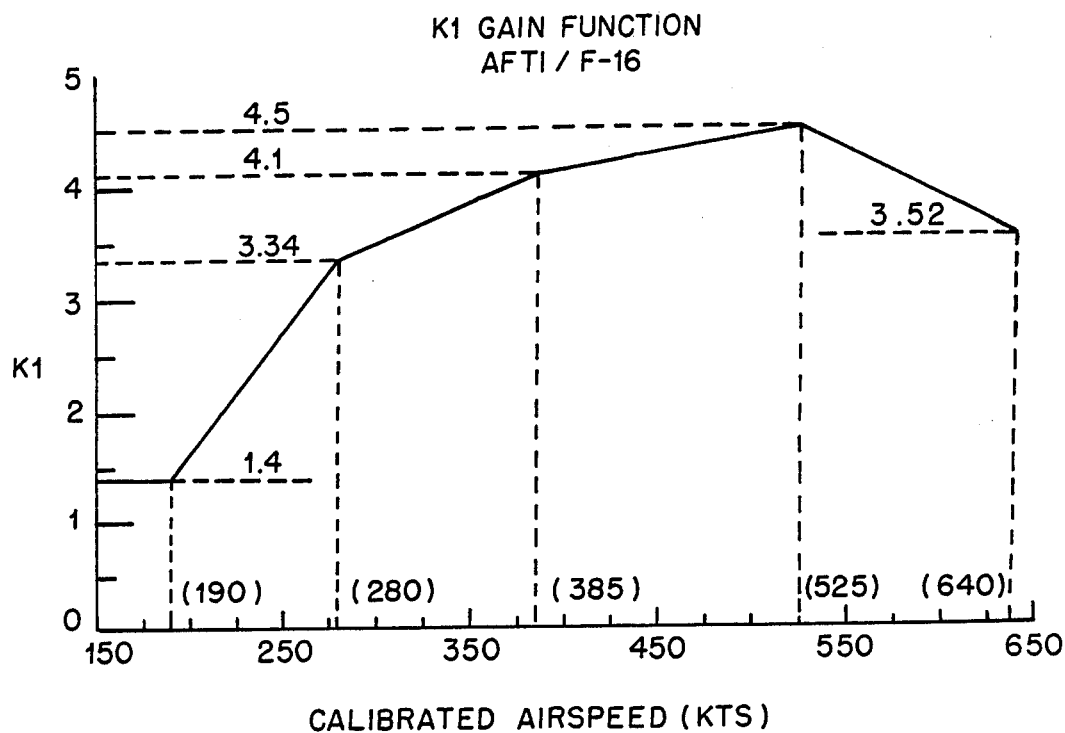
FIG. 6 defines the gain functions $K_1$ for an exemplary F-16 aircraft.

The $K_1$ gain function, shown in FIG. 6, was designed for the AFTI/F-16 aircraft based on a 5 g load factor pullup maneuver and would vary for differing aircraft. The gain function design process involved using F-16A performance data to estimate the general shape of the gain function. This initial gain function estimate was made by comparing 5 g/15° angle of attack capability at various airspeeds and then testing the estimated gain function on a fixed-base simulator using the derived equations. By testing a large matrix of airspeed and dive angle combinations, a plot of minimum recovery altitude above floor altitude vs airspeed or dive angle can be made. This will reveal both deficient areas and areas that are too conservative. An iteration process using the $\Delta Z_1$ equation can then be used to indicate how much $K_1$ has to be changed in order to fix the problem area. Then, using linear regression techniques, a modified $K_1$ gain function can be created and tested. This design process was repeated until all areas of deficiency were eliminated and the $K_1$ gain of FIG. 6 was determined. A similar process can be used to establish $K_1$ gain function values for a variety of aircraft. Note that the value of the N3 gain factor affects $K_1$ gain since possible aircraft load factor during recovery (i.e., 50 percent or 75 percent of maximum) determines the arc of the recovery circle.

G-Onset Compensation

The calculation of $\Delta z_2$ takes the g-force onset rate into account. There is a finite amount of time required to attain the desired pull-up load factor, and this value is dependent on the type of aircraft being flown and the flight control system architecture. Therefore, the time-to-flyup ($T_{up}$) value is biased by $K_2$ seconds, or:

$$\Delta z_2 = K_2(-V_z) \quad (7)$$

where: $V_z$ = vertical velocity (ft/s)

For the AFTI/F-16, this value was approximated as a constant 1.1 seconds for all flight conditions. This value was the time required to achieve 80 percent of the commanded load factor. The variation of $K_2$ over a wide range of airspeeds was not very significant in the F-16 case because of the aircraft's rapid g onset. For other aircraft this term will be more significant and thus may require scheduling with flight condition.

Bank Angle Compensation

The $\Delta z_3$ term compensates for aircraft bank angle at flyup initiation. Since the aircraft must be rolled back to wings level for the pull-up to be effective, extra altitude must be allowed for the roll. The time required to roll to wings level is dependent upon roll rate onset. Roll rate onset is not constant for all flight conditions and for this reason is modeled as a gain function, $K_3$. The equation for $\Delta z_3$ is:

$$\Delta z_3 = \frac{\phi}{K_3}(-V_Z) \quad (8)$$

where:
φ=bank angle in degrees
$V_z$=vertical velocity (ft/s)

The term $\phi/K_3$ is basically bank angle divided by a time constant (deg/sec) which results in a time to roll to wings level. Multiplying this time by the absolute value of the vertical velocity results in a distance, which is labeled as $\Delta z_3$.

Figure 7:
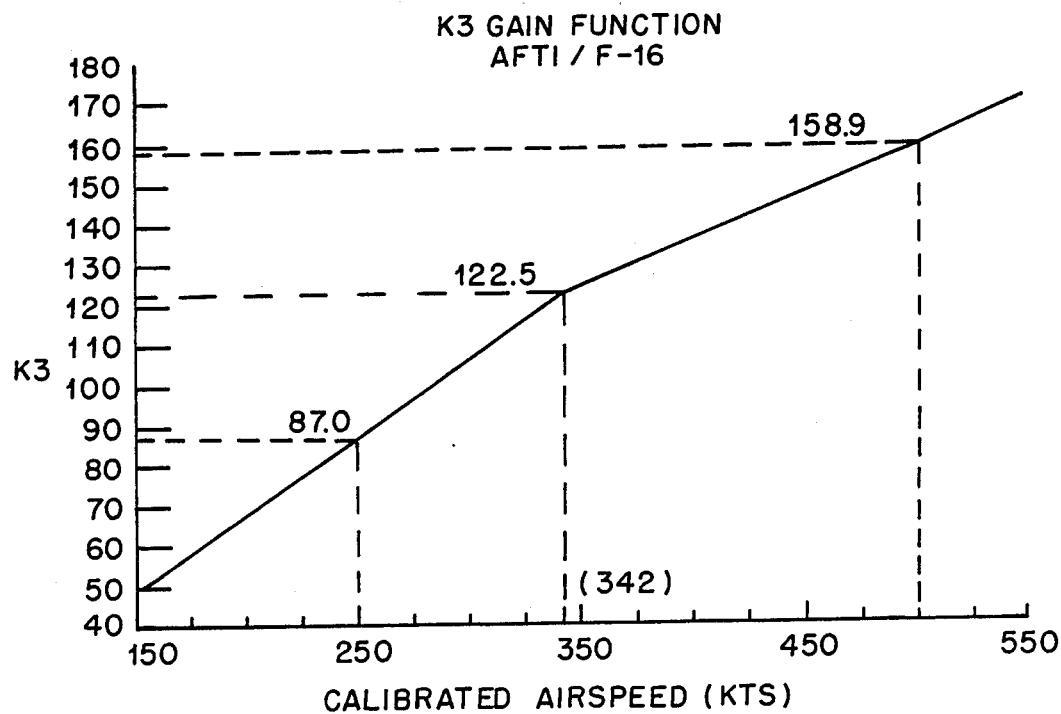
FIG. 7 defines the gain function $K_3$ for the exemplary aircraft based on calibrated air speed.
Figure 8:
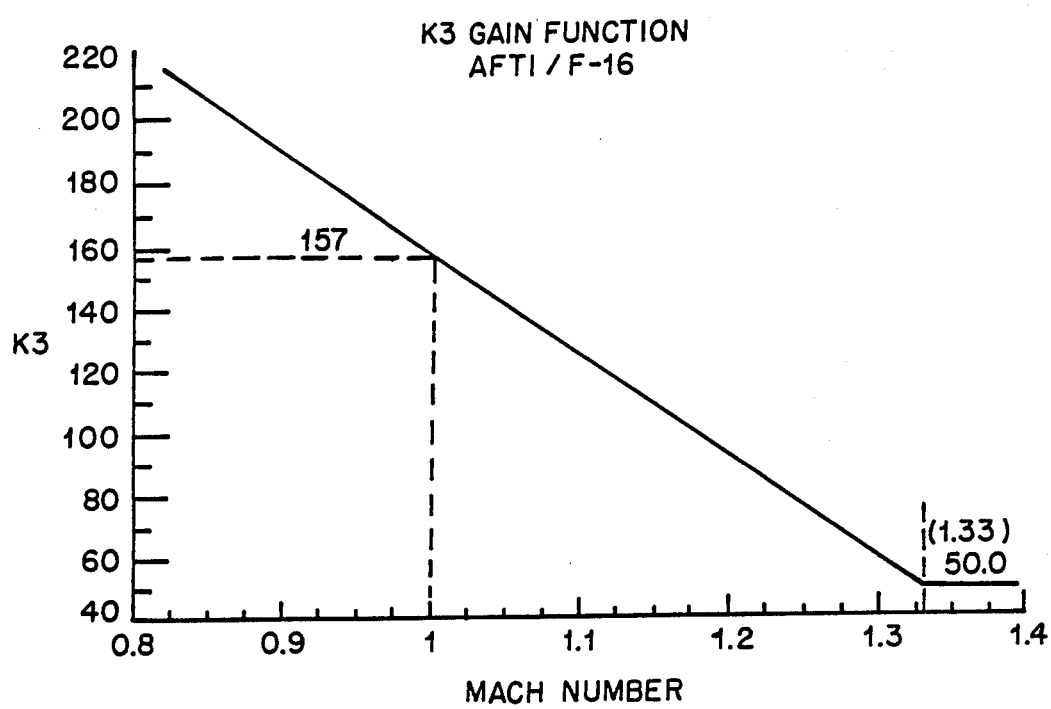
FIG. 8 defines the gain function $K_3$ for the exemplary aircraft based on Mach number.

The exemplary $K_3$ gain function is again derived for the AFTl/F-16 and is shown in FIGS. 7 and 8. For the example given, aileron deflection was directly proportional to roll rate command in the flight control system. Since roll rate commands were not a function of flight condition, but rather only bank angle, the aileron deflection was identical for all flyups As can be seen, the AFTl/F-16 $K_3$ gain actually has two values: one based on calibrated airspeed (FIG. 7), the other on Mach number (FIG. 8). The reason for this is that aileron effectiveness of the F-16 increases with calibrated airspeed up to the transonic region. The aileron effectiveness decreases above 0.95 Mach number. In practice, the smaller of these two $K_3$ values was chosen for use in the $\Delta z_3$ calculation, resulting in the most conservative flyup altitude. The same design process that was employed for the $K_1$ gain function was also used to determine both $K_3$ gain functions, which again are functions of aircraft aerodynamics and will vary for other aircraft. The $K_3$ gain function was designed only after $K_1$ and $K_2$ had been established.

Roll Rate Compensation:

The $\Delta z_4$ term accounts for roll rate at flyup initiation. For manual flight, however, this function can usually be ignored since inattention, g induced loss of consciousness (GLOC), and spatial disorientation cases statistically have low roll rates. The general equation for this factor is given as:

$$\Delta z_4 = \frac{P}{K_4}(-V_Z) \quad (9)$$

where:
$K_4 = f(P)_{aero}$
P = roll rate (deg/sec)

Sensor Lag Compensation

The $\Delta Z_5$ term accounts for sensor lags on the aircraft. Sensor lag is defined as the combination of the time response characteristics of a given sensor for a given input and the sampling rate at which that sensor is sampled by the computer performing the fly up altitude calculations. The most critical of these lags will be the mean sea level (MSL) and above ground level AGL altitude sensors since these are used to determine flyup altitude initiation. The general form for this equation would be:

$$\Delta z_5 = K_5(-V_Z) \quad (10)$$

where: $K_5$ = sensor lag time

For the example AFTl/F-16, the MSL sensor has little or no time lag. Therefore, this term was omitted from the calculations. The AGL sensor did exhibit a measurable lag of approximately 0.1 seconds and, if implemented, $X_5$ would have been 0.1 for AGL calculations.

Excess Thrust Compensation

The equations and gains for $\Delta z_1$, $\Delta z_2$, and $\Delta z_3$ are adjusted for idle power setting or assume an autothrottle. If no autothrottle 80 (FIG. 2) is provided, power settings other than idle will cause varying amounts of accelerations which increase the altitude required for recovery. If this acceleration is accounted for in the proper "theoretical" sense it would be used to approximate an average velocity for each term in the $\Delta Z$ equation. A problem arises with this since the acceleration used at flyup initiation will change under the dynamic conditions of the flyup. Without a very accurate acceleration, the approximated velocity will be incorrect. Because the velocity term is squared in the $\Delta z_1$ equation, the inaccuracies in that velocity will cause the resultant flyup altitude to be very inaccurate. Another problem with this approach is that it imbeds acceleration in all of the $\Delta Z$ terms. This makes it very difficult to adjust any of the individual terms because they no longer account for just one aspect of the flyup maneuver. For these reasons a separate $\Delta z_6$ term was selected to be added to the equation to account for non-idle power settings. This term is not needed if the aircraft has an autothrottle that will adjust the power setting to achieve the airspeed required for a minimum radius turn.

In approaching the non-idle power case, excess power was the logical parameter to relate to flyup altitude. Flyup data that had no compensation for non-idle power showed a definite trend between penetrations, longitudinal body axis acceleration ($A_x$), and calibrated airspeed. Bank angle also affected non-idle recovery altitude and this is discussed below. Data showed that non-idle power should only be compensated for when the airspeed times the vertical component of longitudinal acceleration was above a certain value ($K_{Ps}$).

With wings level:

$$\Delta z_6 = \frac{(V_c (A_x \sin \gamma) - K_{ps})}{K_6} \text{ when } \Delta z_6 > 0 \quad (11)$$

where:
$V_c$ = Calibrated Airspeed (Kts)
$A_x$ = Longitudinal Acceleration (ft/s$^2$)

The value of $K_{Ps}$ corresponded to the flight condition where specific excess power ($P_s$) equalled zero (zero excess thrust) at 5 g of normal load factor. $K_{Ps}$ was equal to the calibrated airspeed (at this condition) times the vertical component of $A_x$ that would be present at 1 g of load factor at the same condition.

For the AFTl/F-16: $K_{PS} = 11,000$

The scaling coefficient to convert the result to feet is labeled $K_6$.

For the AFTl/F-16: $K_6 = 11.85$ This $\Delta z_6$ value returned the non-idle power runs to the same recovery altitude as those done in idle power. By increasing the recovery altitudes for afterburner all the way up to those for idle power, only the non-idle power effect was compensated for, insuring any subsequent changes in $\Delta z_1$, $\Delta z_2$, and $\Delta z_3$ because of idle power problems would not affect the non-idle power case adversely.

Because $\Delta z_3$ is dependent on $V_Z$, non-idle power will have an additional effect when bank angle ($\phi$) is non-zero. Data showed that the only effect was when the aircraft would not quickly load up at flyup initiation ($\phi > 120$ degrees), Above this bank angle, the relationship was linear:

$$\text{or } (|\phi| - 120) K_\phi \text{ used only when positive} \quad (12)$$

Figure 9:
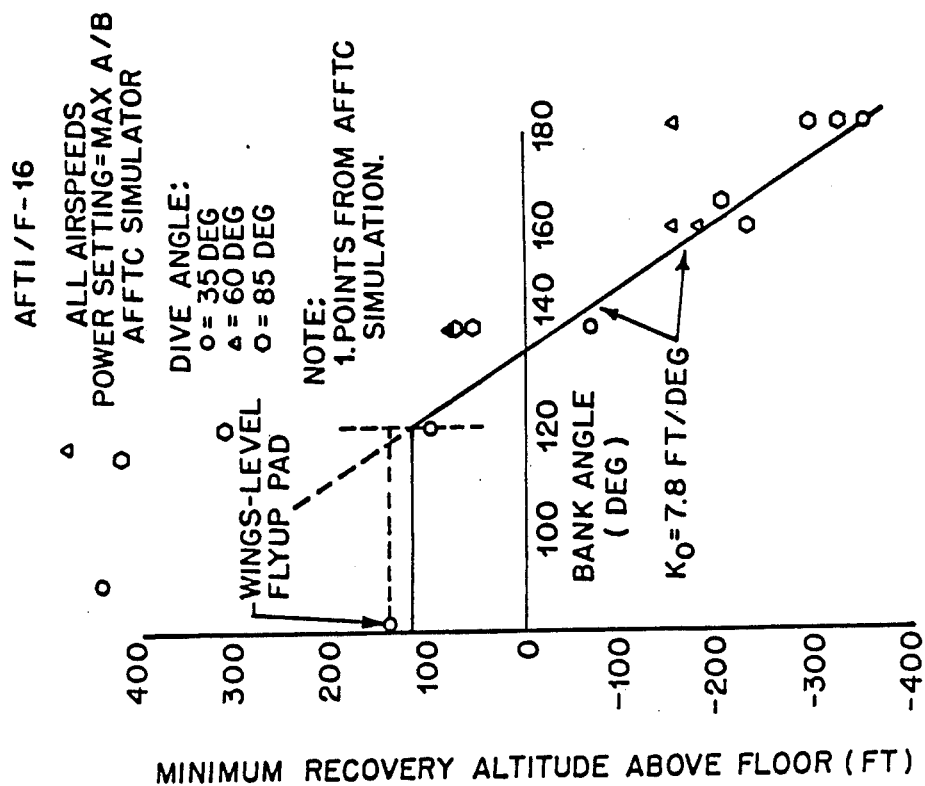
FIG. 9 defines a function which compensates for vertical acceleration with bank angle for the exemplary aircraft.

The value of $K_\phi$ was scaled to bring recovery altitudes of points initiated with bank angle up to wings level recovery altitudes as shown in FIG. 9.

For the AFT1/F-16: $K_\phi = 7.8$ ft/deg

This equation is used for the AFT1/F-16 only when $$V_c(A_x \sin \gamma) > 11{,}000: \quad (13)$$

$$\Delta z_3 = \frac{(V_c (A_x \sin\gamma)) - 11{,}000}{K_6} + (|\phi| - 120)7.8$$

The second part of equation 13 is calculated only when $\phi > 120$ degrees. For other aircraft the value of $K_{PS}$, $K_6$ and $K_\phi$ will differ based on their ability to recover with vertical acceleration and a bank angle.

No recovery system is any more accurate than the sensors and data that it uses. Errors in the altitude and air data that are used by the flight computer can have a dramatic effect on the results. The following section discusses the importance of digital computation rates and the altitude sensor.

Figure 10:
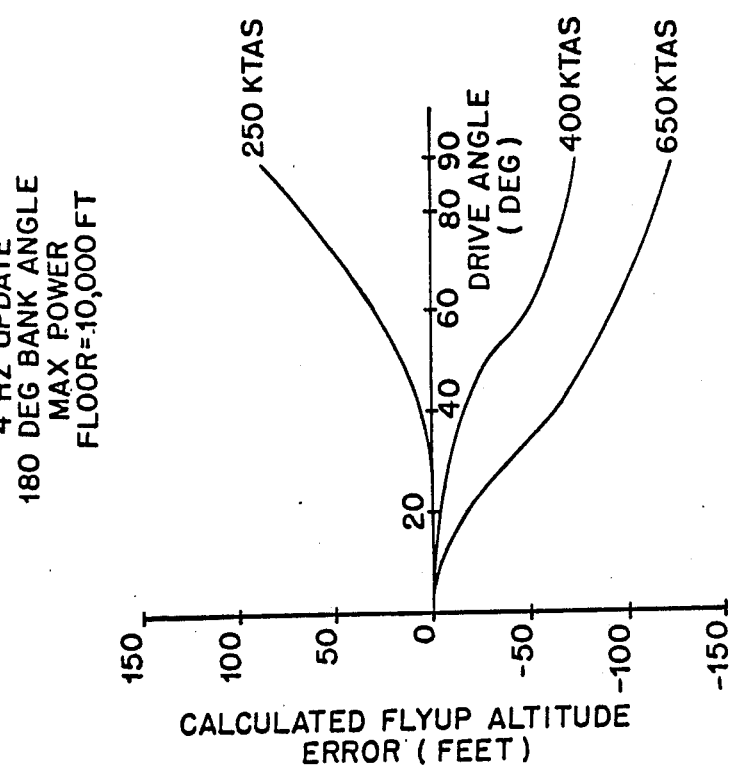
FIG. 10 is a graph showing the calculated fly up altitude error depending upon dive angle and sensor update error for the exemplary aircraft.

The flyup algorithm is based on multiple inputs, some of which are air data information (airspeed, Mach number, true velocity, etc.). The rate that this information is supplied to the algorithm and the rate at which the algorithm is computed has an effect on the accuracy of the calculation. FIG. 10 shows the maximum error in algorithm accuracy for the AFT1/F-16 algorithm using a 4 Hz update and calculation rate. This figure represents the errors that can exist if the digital update rate of the algorithm is too slow. The effect of digital processing rates must be accounted for in the design of every ground collision avoidance system as part of the sensor lag equation or in establishing an increased floor altitude.

Altitude is the most critical data input to the ground collision avoidance system. The ground collision avoidance system that has been presented can use any source of altitude. The more accurate this source is, the more accurate the recovery will be. Ideally this source will provide an indication of the proximity of the terrain at the minimum altitude during the recovery. This information can only be gained through a forward looking sensor or an onboard digital terrain database. If these items are not available, the next best information is that of a radar altimeter which gives the altitude above ground level (AGL) directly below the aircraft. If this also is not available, some form of mean sea altitude (MSL) can be used. Different considerations are needed for each of these altitude sources and are discussed below.

A digital terrain database would be an ideal altitude source for a ground collision avoidance system. Although this system is not available on current aircraft, it will soon be available on future aircraft because of its potential utility. With a digital terrain database, the aircraft flight path can be projected forward and about the aircraft and used to determine the need for flyup initiation. In this manner, variations in terrain can be accounted for and the ground collision avoidance system (GCAS) can provide an all terrain protection capability.

The digital terrain database will allow ground collision avoidance systems to build on this invention. Because the digital terrain data base gives a complete picture of the terrain ahead of the aircraft, the recovery maneuver could pick the most efficient path to avoid that terrain. If, for example, the aircraft approached a canyon wall at an angle, a wings level pullup may not be the most efficient path. Banking and pulling away from the wall would allow a longer delay before the recovery was initiated, and thus have less of an impact on the manual operation of the aircraft. Such "smart" maneuvers will complicate the recovery algorithm, however, this effect can be added when the capability is desired.

A radar altimeter AGL) gives the current altitude of the aircraft above the terrain. This sensor does not, however, sense terrain changes outside of its field of view. Some indication of the terrain ahead of the aircraft can be gained from trends over time in the AGL information. This can at best provide a limited terrain capability.

Nuisance warnings and recoveries will occur over rough terrain if terrain is extrapolated in front of the aircraft based on nothing more than current rate of change of AGL altitude. To avoid nuisance flyups that would interfere with normal pilot flight activities, limits must be placed on the amount of terrain extrapolation that can be made. As these limits are imposed, the recovery system will no longer be 100 percent effective in protecting against ground impact.

A variable load factor recovery maneuver can be used to gain additional terrain avoidance capability. By optimizing the recovery maneuver to pull out at the floor altitude with a constant load factor, the load factor for the maneuver can be increased if terrain begins to rise after recovery initiation. This will provide some additional terrain capability. A further discussion of the use of a variable load factor and ridge clearance capabilities can be found below.

A majority of the aircraft flying today do not have any source for altitude AGL. Failing to have this source does not disqualify a ground collision avoidance system from being useful. Most aircraft only work in close proximity to the ground while in the landing phase or during surface air-support roles. The majority of the areas where these activities take place is over flat terrain with known altitudes. This, therefore, makes a mean sea level (MSL) altitude source a viable option. Barometric altitude is available on all aircraft. This altitude source can have large errors but can still be used to provide a certain degree of protection. Over fairly level terrain a normal or minimum for altitude should be used while over mountainous terrain a higher floor altitude should be used to insure sufficient recovery margin.

Barometric altitude can have large delays in the information it provides, and these delays must be taken into account. Barometric altitude can also have large errors in its information due to atmospheric conditions. Position error will affect recovery performance and must be accounted for by the pilot whenever possible. A large error in barometric altitude can also be caused by temperature effects at various altitudes. Nonstandard day temperatures at altitude can cause errors greater than 15 percent when compared to the floor altitude. Recoveries initiated based upon this altitude source can have large variations in actual recovery altitude, depending on the size of these temperature associated errors. Sensor lag and temperature effects can be accounted for mathematically if given the proper information, however, position error must be accounted for by the pilot.

Our exemplary aircraft, the AFTI-F-16, was tested using the ground collision avoidance system described above and an alternate system using a radar altimeter (AGL). In comparing the results, there appear to be some tradeoffs between a look ahead terrain slope capability (through extrapolation) and low level ridge clearance in both providing protection for the aircraft and avoiding nuisance flyups. These tradeoffs can be somewhat avoided by giving the flyup autopilot the ability to vary load factor.

As mentioned above, a lack of look ahead capability can be accounted for by using AGL data and extrapolating the terrain slope under the aircraft forward in time. This, however, makes flight near the preselected minimum flight altitude sensitive to small changes over even relatively flat terrain. Events such as crossing the edge of a dry lake bed at 50 feet above the preselected minimum descent of altitude can result in inadvertent flyups due to small terrain changes.

Best operation of the auto recovery system provides for the transparency of the system to the pilot. Transparency is gauged by the amount of nuisance flyups that occur as the pilot flies a normal navigation profile; transparency corresponds to a lower number of nuisance flyups.

Figure 11:
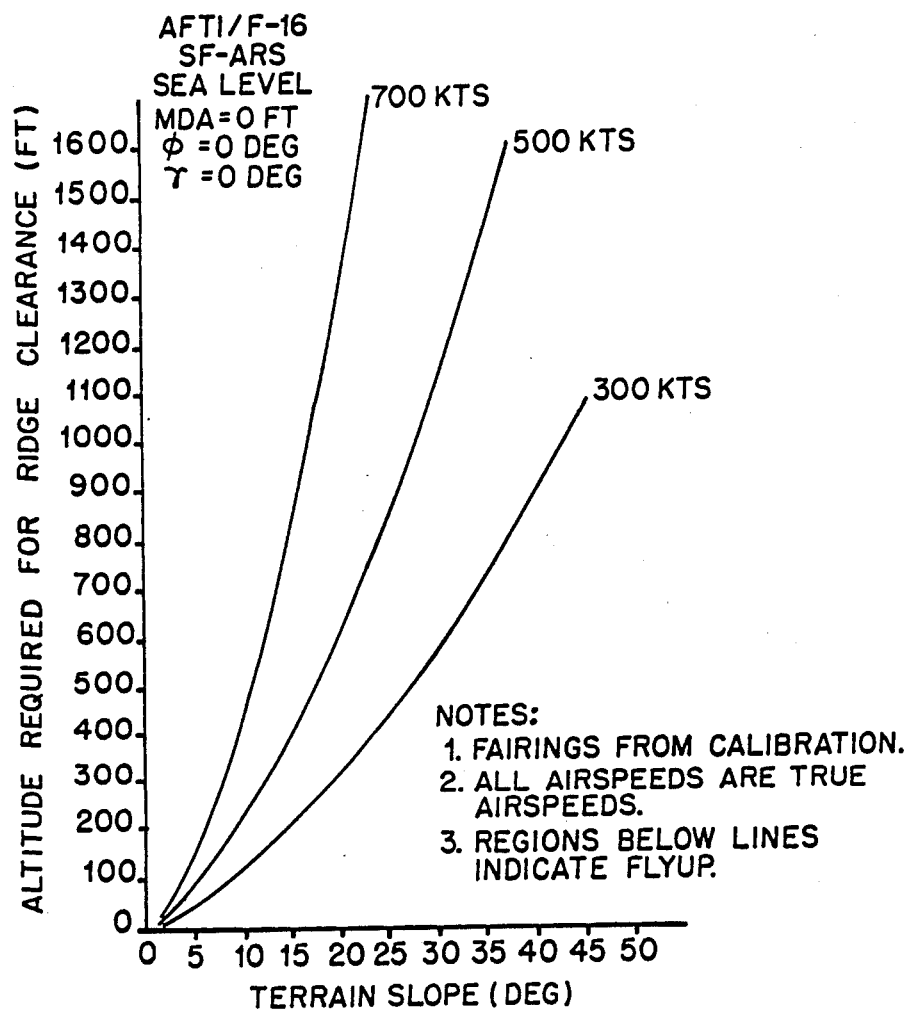
FIG. 11 is a graph showing minimum ridge clearance capability for an F-16 aircraft equipped with the auto recovery system of this invention.

FIG. 11 is a graph showing the minimum ridge clearance capability of the test aircraft having an AGL sensor and terrain extrapolation capability for several airspeeds/KTAS (knots true airspeed). The capability of this ground collision avoidance system at various air speeds and bank angles was determined for the AFTI/F-16 aircraft. Regions below the lines at each air speed indicate flyups according to the ground collision avoidance system (GCAS). The left side of the graph shows the minimum altitude required for ridge clearance at each speed depending on the terrain slope.

Figure 12:
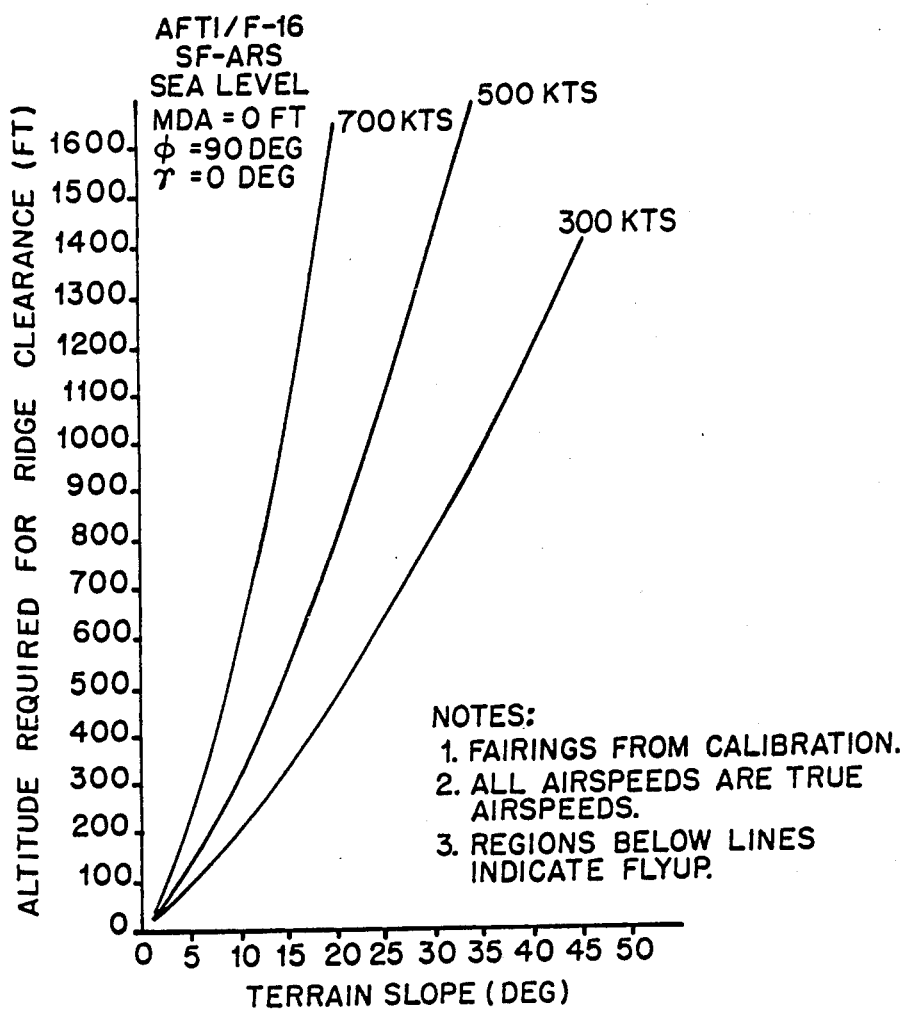
FIG. 12 is a graph showing minimum ridge clearance capability for an F-16 aircraft initially at 90 degrees of bank equipped with the auto recovery system of this invention.

FIG. 12 shows the minimum ridge clearance capability of the GCAS with the aircraft initially at 90 degrees of bank. The vertical scale shows the altitude required for safe ridge clearance.

Figure 13:
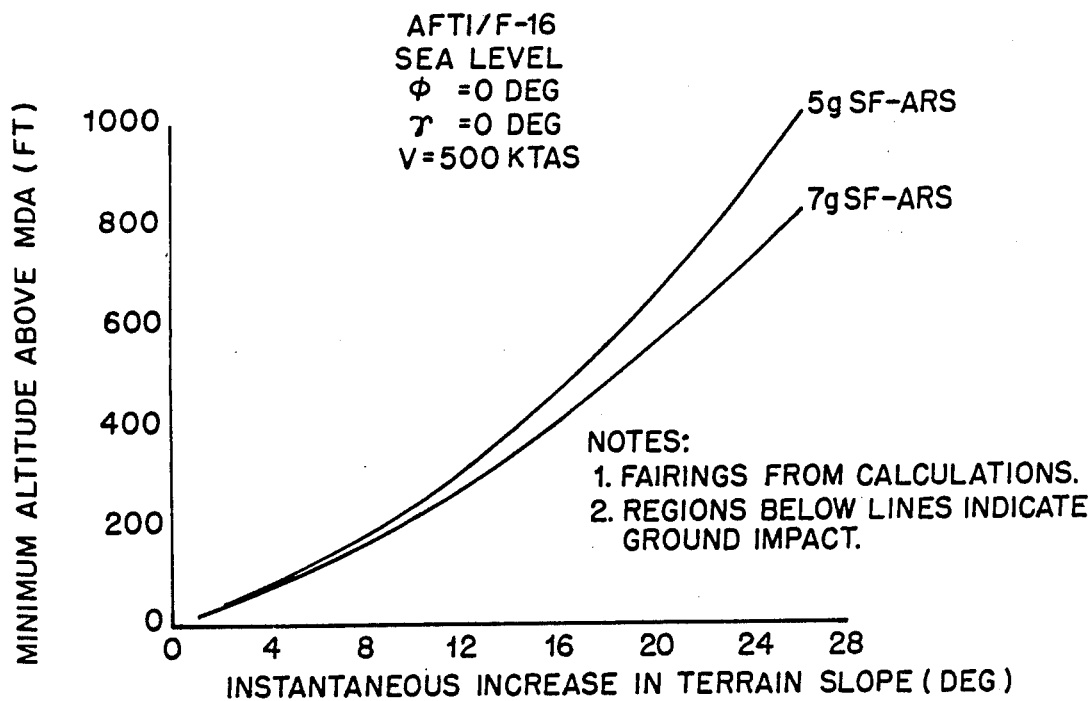
FIG. 13 is a graph showing the theoretical effect of allowing an adjustable load factor command that could command increased g loading on an aircraft if increased terrain slope is sensed.

FIG. 13 presents the theoretical effect of allowing an adjustable load factor command that could, for example, command 7 g's if a increasing terrain slope is sensed. The 7 g command would only be used if the flight computer received data from the altitude above ground level (AGL) source that the standard (5 g) pullup was not going to prevent ground impact. The extra 2 g command could then be used to avoid the rising terrain. Different aircraft would have different margins for high g commands. Loading limits might be violated in this situation but it would be preferable to ground impact. The use of a variable load factor flyup maneuver in protecting against rising terrain can be considered as a further emergency flyup response. The normal pull up manuever using the safe constant g recovery can, however, be sufficiently refined to provide satisfactory results in most situations.

While the invention has been particularly described with reference to the preferred embodiments thereof, it will be understood by those skilled in the art that various changes in substance and form can be made therein without having departed from the spirit and the scope of the invention as detailed in the attached claims. For example the GCAS can be easily modified for use with a variety of aircraft having different types of controls and input sensors.

We claim:

1. An aircraft ground collision avoidance system comprising:
    (a) means for computing a flyup, said flyup computing means receiving sensor signals which represent aircraft flight states and calculating preferred aircraft flyup altitudes at which an automatic aircraft flyup should be initiated, wherein each aircraft flyup altitude of said preferred aircraft flyup altitudes is calculated by determining the aircraft altitude which is lost ($\Delta Z$) during a recovery maneuver due to a current aircraft flight state; and
    (b) means for automatically controlling an aircraft, said automatic aircraft controlling means receiving aircraft flight data and implementing an automatic aircraft flyup when said preferred aircraft flyup altitude is achieved, wherein said aircraft flight states and data include aircraft angle of attack and bank angle, said preferred aircraft flyup altitude is provided to said automatic aircraft controlling means by said flyup computing means.

2. The aircraft ground collision avoidance system of claim 1 wherein the flyup computing means utilizes aircraft speed and angle of attack to determine flyup altitudes.

3. The aircraft ground collision avoidance system of claim 2 wherein the flyup computing means also utilizes aircraft bank angle to determine flyup altitudes.

4. The aircraft ground collision avoidance system of claim 3 wherein the flyup computing means also utilizes aircraft roll rate to determine flyup altitudes.

5. The aircraft ground collision avoidance system of claim 2 wherein the flyup computing means also considers aircraft sensor lag to determine flyup altitudes, wherein aircraft sensor lag is characterized by the time which elapses between a change in an aircraft flight state and a sensor response to that change.

6. The aircraft ground collision avoidance system of claim 1 wherein the flyup computing means compensates for non-idle aircraft engine power settings when determining aircraft flyup altitudes.

7. The aircraft ground collision avoidance system of claim 1 wherein said automatic aircraft controlling means further comprises angle of attack and roll rate limiters for preventing overloading of aircraft structures during an automatic aircraft flyup.

8. The aircraft ground collision avoidance system of claim 1 wherein said automatic aircraft controlling means includes an autopilot, said automatic aircraft controlling means also monitors aircraft load factors and further includes means for limiting load, said load limiting means prevents overloading of the aircraft structures during autorecovery which limits operation of said autopilot so as to prevent said autopilot from implementing an automatic flyup in a manner which would exceed predetermined aircraft load limit, said predetermined aircraft load limit being stored in said flyup computing means.

9. The aircraft ground collision avoidance system of claim 1 wherein the aircraft altitude calculated to be lost ($\Delta Z$) is equal to the sum of:

$$\Delta z_1 + \Delta z_2 + \Delta z_3$$

and is used by the flyup computing means to determine when to initiate a flyup and wherein:
    $\Delta z_1$ accounts for altitude lost during a wings level dive to level flight while maintaining a constant load factor;

$\Delta z_2$ accounts for the amount of time required for an aircraft to attain a desired pullup load factor; and $\Delta z_3$ accounts for correcting initial bank angle during a flyup.

10. The aircraft ground collision avoidance system of claim 9 wherein $\Delta Z$ further is equal to the sum including $\Delta z_4$ which accounts for aircraft roll rate at flyup initiation.

11. The aircraft ground collision avoidance system of claim 9 wherein $\Delta Z$ further is equal to the sum including $\Delta z_5$ which accounts for sensor lags in determining a flyup initiation, wherein aircraft sensor lag is characterized by the time which elapses between a change in an aircraft flight state and a sensor response to that change.

12. The aircraft ground collision avoidance system of claim 9 wherein $\Delta Z$ further is equal to the sum including $\Delta z_6$ which adjusts for aircraft non-idle power settings.

13. The aircraft ground collision avoidance system of claim 9 further comprising an autothrottle for adjusting airspeed to provide aircraft flyup with a minimum turn radius when the flyup computing means initiate an automatic flyup.

14. The aircraft ground collision avoidance system of claim 1 wherein the aircraft altitude calculated to be lost ($\Delta Z$) is equal to the sum of:

$$\Delta z_1 + \Delta z_2 + \Delta z_3 + \Delta z_4 + \Delta z_5$$

and is used by the flyup computing means to determine when to initiate a flyup and wherein:

$\Delta z_1$ accounts for altitude lost during a wings level dive to level flight while maintaining a constant load factor;

$\Delta z_2$ accounts for the amount of time required for an aircraft to attain a desired pullup load factor;

$\Delta z_3$ accounts for correcting initial bank angle during a flyup;

$\Delta z_4$ accounts for aircraft roll rate at flyup initiation; and $\Delta z_5$ accounts for sensor lags in determining a flyup initiation, wherein aircraft sensor lag is characterized by the time which elapses between a change in an aircraft flight state and a sensor response to that change.

15. The aircraft ground collision avoidance system of claim 14 wherein $\Delta Z$ further is equal to the sum including $\Delta z_6$ which adjusts for aircraft non-idle power settings.

16. The aircraft ground collision avoidance system of claim 13 further comprising an autothrottle for adjusting airspeed to provide aircraft flyup with a minimum turn radius when the flyup computing means initiate an automatic flyup.

17. A method of automatically avoiding aircraft ground collision comprising the steps of:

entering a preselected aircraft flight floor altitude in an aircraft flight computer;

monitoring aircraft flight states with said flight computer, said flight states including air speed, altitude and flight path angles;

calculating by said flight computer the amount of altitude to be lost during recovery maneuver if the monitored flight states, when extrapolated would indicate a loss of altitude;

adding by said flight computer the amount of altitude to be lost as indicated by the monitored flight states during the recovery maneuver to the preselected floor altitude to determine a flyup altitude;

comparing by said flight computer the flyup altitude to aircraft altitude; and sending a command via said flight computer to an autopilot to commence initiation of an automatic flyup maneuver if aircraft altitude is less than the preselected aircraft flight floor altitude.

18. The method of automatically avoiding aircraft ground collisions of claim 17 further comprising the steps of:

monitoring aircraft bank angle in order to control aircraft elevator deflection during the automatic aircraft flyup; and monitoring aircraft pitch attitude in order to control aircraft aileron deflection during the automatic aircraft flyup.

19. The method of automatically avoiding aircraft ground collisions of claim 17 further comprising the step of:

selectively combining pilot flight commands with the automatic flyup.

20. The method of automatically avoiding aircraft ground collisions of claim 17 wherein said step of calculating the amount of aircraft altitude to be lost during a recovery maneuver is performed by said flight computer by calculating $\Delta Z$, which is equal to the sum of:

$$\Delta z_1 + \Delta z_2 + \Delta z_3$$

wherein:

$\Delta z_1$ accounts for altitude lost during a wings level dive to level flight while maintaining a constant load factor;

$\Delta z_2$ accounts for the amount of time required for an aircraft to attain a desired pullup load factor; and $\Delta z_3$ accounts for correcting initial bank angle during a flyup.

21. The method of automatically avoiding aircraft ground collisions of claim 17 wherein the step of calculating the amount of aircraft altitude to be lost during a recovery maneuver is performed by said flight computer by calculating $\Delta Z$, which is equal to the sum of:

$$\Delta z_1 + \Delta z_2 + \Delta z_3 + \Delta z_4 + \Delta z_5$$

wherein:

$\Delta z_1$ accounts for altitude lost during a wings level dive to level flight while maintaining a constant load factor;

$\Delta z_2$ accounts for the amount of time required for an aircraft to attain a desired pullup load factor;

$\Delta z_3$ accounts for correcting initial bank angle during a flyup;

$\Delta z_4$ accounts for aircraft roll rate at flyup initiation; and $\Delta z_5$ accounts for sensor lags in determining a flyup initiation, wherein aircraft sensor lag is characterized by the time which elapses between a change in an aircraft flight state and a sensor response to that change.

22. The method of automatically avoiding aircraft ground collisions of claim 21 wherein $\Delta Z$ further is equal to the sum includes $\Delta z_6$ which adjusts for aircraft non-idle power settings.

23. An autopilot for automatically performing an aircraft altitude recovery comprising:

(a) an angle of attack limiter including an angle of attack detector, for producing an angle of attack signal that limits aircraft angle of attack to within an aircraft stall margin during aircraft altitude recovery;

(b) a g-force limiter including a g-force detector for producing a signal that prevents overloading of aircraft structures during aircraft altitude recovery;

(c) a bank angle recovery signal generating means including a bank angle detector, generating a signal for controlling aircraft elevators to promote aircraft altitude recovery;

(d) an elevator summing junction for combining signals from said angle of attack limiter, said g-force limiter and said bank angle recovery generating means to provide a sum signal to control aircraft elevators to achieve aircraft recovery without exceeding aircraft flight capabilities;

(e) a roll rate limiter including a roll rate detector, for providing a signal to eliminate excessive aircraft roll; and (f) an aileron summing junction for combining signals from said roll rate limiter and the bank angle detector to provide a sum signal to control aircraft ailerons to achieve level flight and aircraft altitude recovery.

24. The autopilot for automatically performing an aircraft recovery maneuver of claim 23 further comprising pitch angle signal generating means for preventing an automatic bank angle adjustment by the aircraft ailerons at very high aircraft pitch angles.

25. The autopilot for automatically performing an aircraft altitude recovery maneuver of claim 23 further comprising manual control summing junctions for combining pilot commands with automatic control of the aircraft elevators and ailerons.

26. The autopilot for automatically performing an aircraft altitude recovery maneuver of claim 25 further comprising pilot command stick-force breakout limiters for preventing inadvertent pilot commands from influencing the autopilot during an autorecovery.

* * * * *

UNITED STATES PATENT AND TRADEMARK OFFICE
CERTIFICATE OF CORRECTION

PATENT NO. : 4,924,401
DATED : May 8, 1990
INVENTOR(S) : Gregory W. Bice et al

It is certified that error appears in the above-identified patent and that said Letters Patent is hereby corrected as shown below:

In column 13, equation 13, change "$\Delta z3$" to --$\Delta z_6$--.

Signed and Sealed this

Fourth Day of February, 1992

Attest:

HARRY F. MANBECK, JR.

*Attesting Officer*      *Commissioner of Patents and Trademarks*